US005541414A

United States Patent [19]

Hori

[11] Patent Number: 5,541,414

[45] Date of Patent: Jul. 30, 1996

[54] INFRARED SENSOR APPARATUS

[75] Inventor: Kenji Hori, Kyoto-fu, Japan

[73] Assignee: Murata Mfg. Co., Ltd., Japan

[21] Appl. No.: 269,665

[22] Filed: Jul. 1, 1994

[30] Foreign Application Priority Data

Jul. 9, 1993 [JP] Japan ..................................... 5-42921

[51] Int. Cl.$^6$ ..................................................... G01J 5/08

[52] U.S. Cl. ..................................... 250/349; 250/DIG. 1

[58] Field of Search ............................. 250/DIG. 1, 349, 250/342

[56] References Cited

U.S. PATENT DOCUMENTS

| | | | |
|---|---|---|---|
| 3,829,693 | 8/1974 | Schwarz | 250/338.1 |
| 4,058,726 | 11/1977 | Paschedag et al. | 250/353 |
| 4,249,207 | 2/1981 | Harman et al. | 348/152 |
| 4,321,594 | 3/1982 | Galvin et al. | 340/567 |
| 4,740,701 | 4/1988 | Wüthrich et al. | 250/342 |
| 5,101,194 | 3/1992 | Sheffer | 340/567 |
| 5,313,060 | 5/1994 | Gast et al. | 250/221 |

FOREIGN PATENT DOCUMENTS

| | | |
|---|---|---|
| 2035007 | 6/1980 | United Kingdom . |
| 2256482 | 9/1992 | United Kingdom . |

*Primary Examiner*—Constantine Hannaher
*Attorney, Agent, or Firm*—Howell & Haferkamp, L.C.

[57] ABSTRACT

An infrared sensor apparatus has an infrared array element having infrared detection portions arranged at a plurality of positions in a two-dimensional array, and a plurality of infrared lenses arranged such that infrared images from a detection area divided into a plurality of portions are formed on the corresponding infrared detection portions without any superposition. These infrared lenses are a plurality of cylindrical lenses or Fresnel lenses.

17 Claims, 4 Drawing Sheets

FIG. 5A ADULT IN AREA W-III
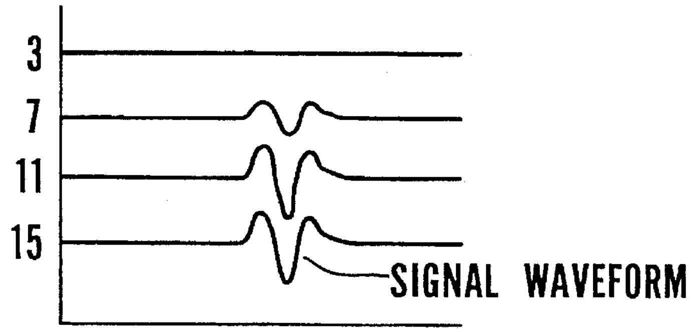
FIG. 5B ADULT IN AREA Y-IV
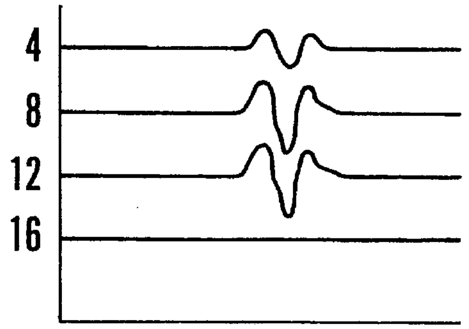
FIG. 5C CHILD IN AREA X-I
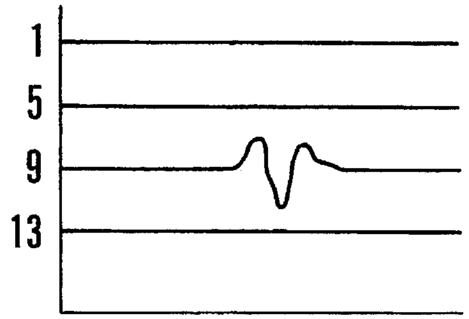
FIG. 5D CHILD IN AREA Z-II
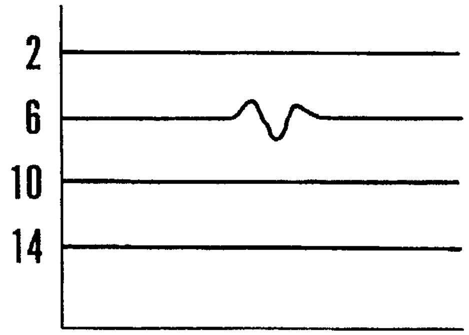

INFRARED SENSOR APPARATUS

BACKGROUND OF THE INVENTION

1. Field of the Invention

The present invention relates to an infrared sensor apparatus for detecting an infrared heat source such as a human body.

2. Description of the Related Art

FIG. 1 is a view showing a conventional infrared sensor apparatus. In this infrared sensor apparatus, one Fresnel lens 2 as an infrared lens is arranged for one infrared sensor 1 on the incident side of the sensor 1. This Fresnel lens 2 defines, e.g., a plurality of infrared detection areas A to D.

However, in this infrared sensor apparatus, for example, when an infrared heat source such as a human body enters the infrared detection areas A to D, the Fresnel lens 2 condenses infrared radiation from the plurality of areas, thereby detecting the infrared heat source with one fixed infrared sensor 1. In this case, only the presence/absence of an infrared heat source or movement thereof is detected. A variety of information such as the position, the moving direction, and the moving speed of the infrared heat source can hardly be detected in detail.

To detect information from an infrared heat source in detail, a method is proposed, in which the fixed infrared sensor 1 and the Fresnel lens are mechanically moved to form the plurality of detection areas A to D.

In another infrared sensor apparatus, as shown in FIG. 2, a plurality of infrared sensors 1A to 1D are utilized. The condensing portions of the Fresnel lens 2 are disposed in correspondence with the infrared sensors 1A to 1D, thereby individually detecting infrared radiation from the detection areas A to D.

In the method of mechanically moving one infrared sensor 1, however, a moving unit, a movement control unit, and the like are required, resulting in a bulky and complicated apparatus. When the plurality of infrared sensors 1A to 1D are used, as in FIG. 2, the condensing portions of the Fresnel lens 2 must correspond to the infrared detection areas A to D. In this case, since a large lens is used, highly precise manufacturing of the lens becomes very difficult, and images may be blurred in some regions of the lens. Additionally, the apparatus becomes bulky and expensive.

SUMMARY OF THE INVENTION

The present invention has been made to solve the above problems, and has as its object to provide a compact and inexpensive infrared sensor apparatus capable of accurately detecting a variety of information, and capable of being easily assembled without requiring the highly precise manufacture of an infrared lens.

In order to achieve the above object, according to the first aspect of the present invention, there is provided an infrared sensor apparatus comprising an infrared array element having infrared detection portions arranged at a plurality of positions in a two-dimensional array, and a plurality of infrared lenses arranged on an infrared incident side of the infrared array element such that infrared images from a detection area divided into a plurality of areas are individually formed on the corresponding infrared detection portions without any superposition.

According to the second aspect of the present invention, there is provided an infrared sensor apparatus wherein the plurality of infrared lenses of the first aspect are a plurality of cylindrical lenses, and each of the cylindrical lenses is arranged in correspondence with each of the column or row detection portions of the infrared array element.

According to the third aspect of the present invention, there is provided an infrared sensor apparatus wherein the plurality of infrared lenses of the first aspect are a plurality of Fresnel lenses, and each of the Fresnel lenses is arranged in correspondence with the detection portions of the infrared array element, and each of the detection portions comprises a block of pixels having the same number of pixels in the column and row directions.

According to the present invention, a plurality of infrared lenses are disposed in correspondence with a plurality of detection portions of a two-dimensional infrared array element such that infrared images from infrared detection areas are formed on the corresponding infrared detection portions without any superposition. Therefore, infrared radiation incident from an infrared heat source such as a human body is condensed by the infrared lenses corresponding to the infrared detection areas and focused on the corresponding detection portions. The infrared detection portions individually output signals. By analyzing these output signals, a variety of information such as the position, the size, the moving direction, and the moving speed of the infrared heat source can be accurately detected.

In addition, one two-dimensional infrared array element is used as the infrared sensor, and a plurality of infrared lenses are used. With this simple arrangement, the infrared sensor requires neither a driving unit nor a driving control unit, so that a compact and inexpensive infrared sensor apparatus can be easily manufactured and assembled.

Furthermore, as is well known, a cylindrical lens focuses incident infrared radiation without blurring and variations. With the arrangement in which the cylindrical lenses are used as the infrared lenses, the infrared radiation is condensed without variations, and an image is formed without blurring. Therefore, highly accurate detection of information can be performed.

The above and many other advantages, features and additional objects of the present invention will become manifest to those versed in the art upon making reference to the following detailed description and accompanying drawings in which preferred structural embodiments incorporating the principles of the present invention are shown by way of illustrative example.

BRIEF DESCRIPTION OF THE DRAWINGS

FIGS. 5A to 5D illustrate the output signals from the infrared sensor of FIG. 3A.

DETAILED DESCRIPTION OF THE PREFERRED EMBODIMENTS

Figure 1:
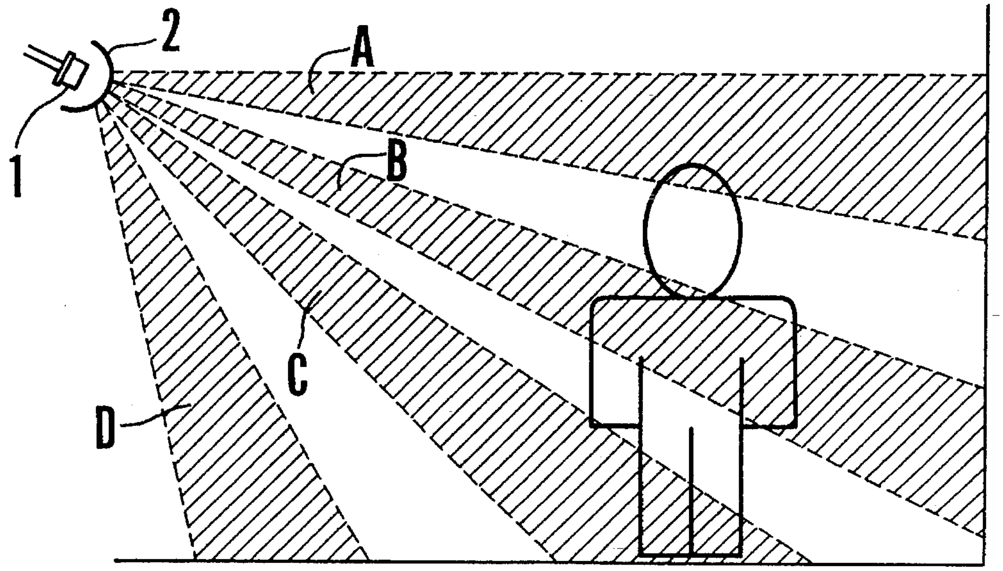
FIG. 1 PRIOR ART
FIG. 1 illustrates a conventional infrared sensor apparatus.
Figure 2:
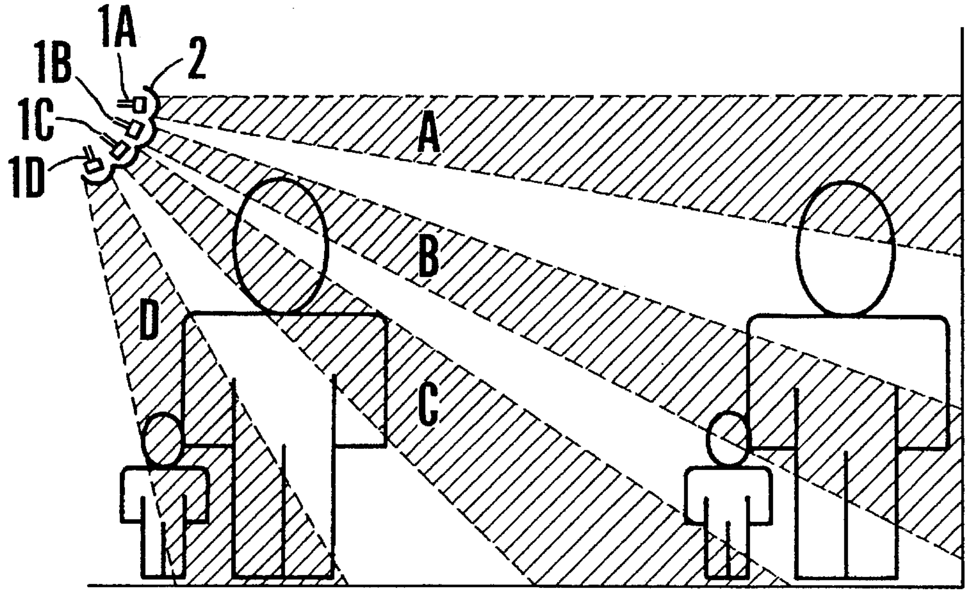
FIG. 2 PRIOR ART
FIG. 2 illustrates another conventional infrared sensor apparatus.
Figure 3A:
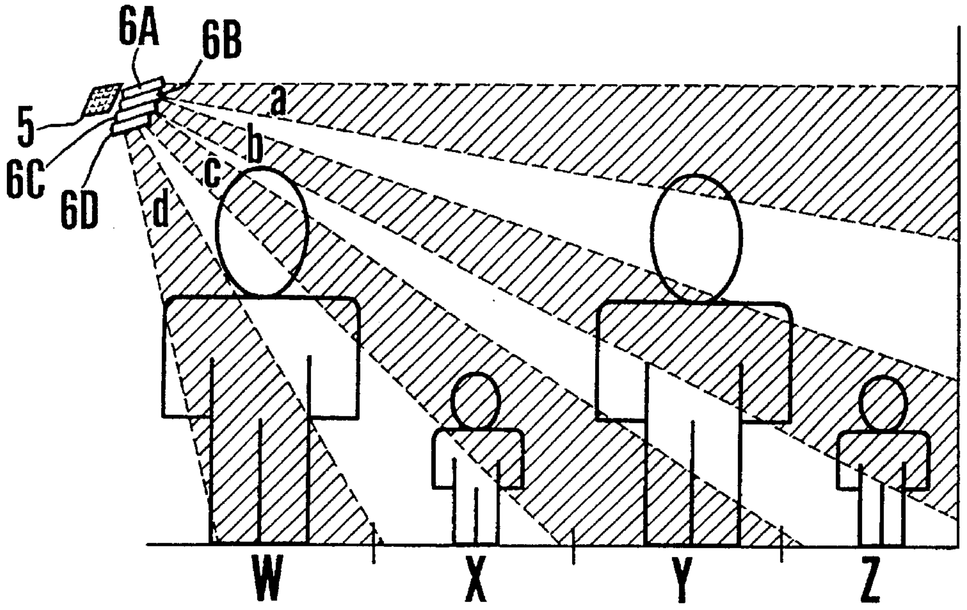
FIGS. 3A and 3B illustrate an infrared sensor apparatus according to the first embodiment of the present invention.
Figure 3B:
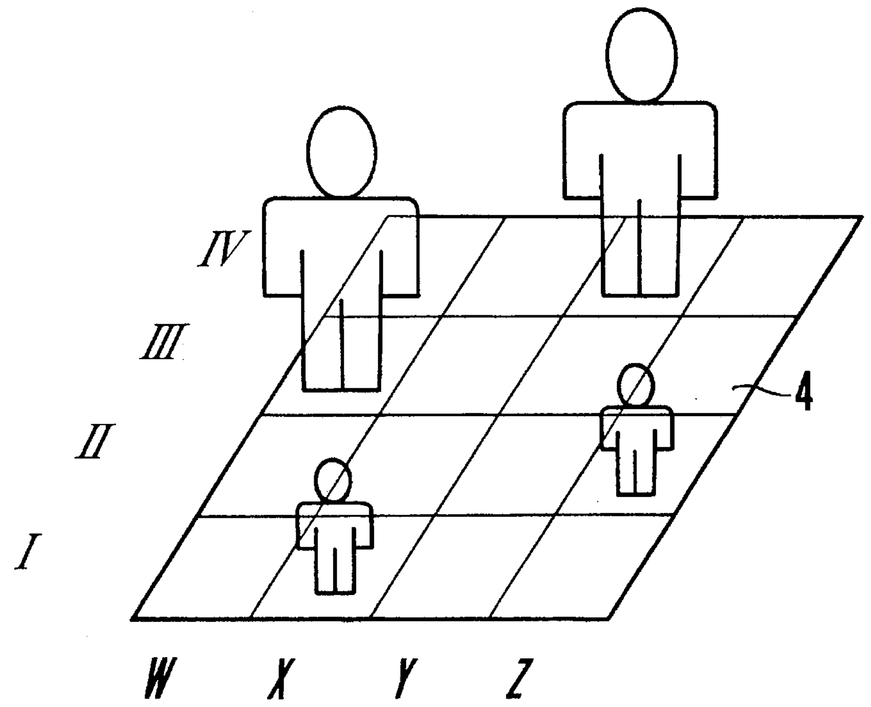
Figure 4:
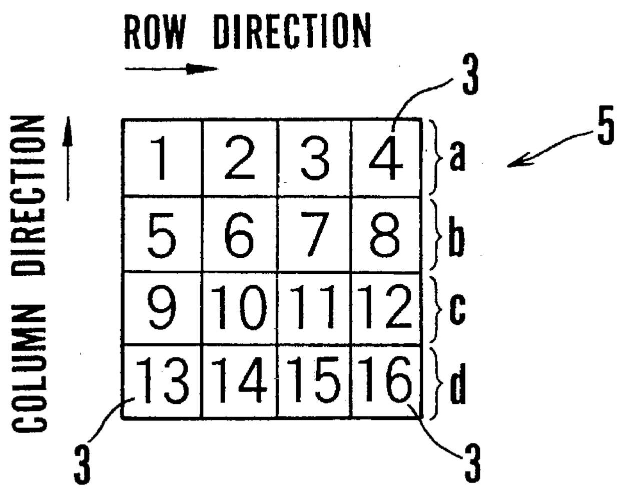
FIG. 4 illustrates an infrared array element in the first embodiment of the present invention.

Preferred embodiments of the present invention will be described below with reference to the accompanying drawings. FIGS. 3A and 3B are views showing an infrared sensor apparatus of the first embodiment. This infrared sensor apparatus has, an infrared array element 5 as an infrared sensor, and a plurality of cylindrical lenses 6A to 6D as infrared lenses. As shown in FIG. 4, the infrared array element 5 includes a plurality of infrared pixels 3 comprising, e.g., pyroelectric electrodes, arranged in a two-dimensional array (a plurality of pixels are arrayed in both the column and row directions). The cylindrical lenses 6A to 6D consist of, e.g., high-density polyethylene or the like. The cylindrical lenses 6A to 6D are arranged on the infrared incident side of the infrared array element 5 to focus infrared images from divided detection areas a to d onto the corresponding infrared pixels 3 of the infrared array element 5 without any superposition. Each of the cylindrical lenses 6A to 6D corresponds to one array of pixels 3 in the row direction of the infrared array element 5.

As shown in FIG. 4, the infrared array element 5 is divided into sixteen pixels 3. The four arrays in the row direction correspond to the infrared detection areas a to d. The pixels of pixel numbers 1 to 4 detect infrared radiation from only the infrared detection area a, and the pixels of pixel numbers 5 to 8 detect infrared radiation from the area b. Similarly, the pixels of pixel numbers 9 to 12 detect infrared radiation from the area c, and the pixels of pixel numbers 13 to 16 detect infrared radiation from the area d. Detection signals generated by these pixels are individually extracted and amplified by an amplifier (not shown).

As shown in FIG. 3B, a floor 4 where an infrared heat source such as a human body enters is divided into 4×4 portions in the column and row directions to form 16 areas for descriptive convenience. Areas in the column direction are defined as W, X, Y, and Z, and areas in the row direction are defined as I, II, III, and IV.

FIGS. 5A to 5D are graphs showing signal waveforms from the infrared sensor of the first embodiment. Numbers along the ordinates represent the pixel numbers of the pixels of the infrared array element 5. An output voltage waveform for each pixel number is shown. Time is plotted along the abscissa.

An example of the infrared sensor apparatus of the first embodiment will be described below. If an adult as an infrared heat source enters area W-III of the floor 4, as shown in FIG. 3B, most infrared radiation from the infrared heat source is condensed by the lens 6D corresponding to the infrared detection area d, as shown in FIG. 3A. As shown in FIG. 5A, a signal having a large waveform is output from the pixel of pixel number 15 corresponding to the entrance position of the infrared heat source. The head portion is in the infrared detection area c, so the infrared radiation is condensed by the lens 6C corresponding to the infrared detection area c. The pixel of pixel number 11 corresponding to the position of the infrared heat source outputs a signal having a midsize waveform, as shown in FIG. 5A. The distal end of the head slightly enters the area b. The infrared radiation is condensed by the lens 6B corresponding to the area b, and the pixel of pixel number 7 outputs a signal having a small waveform.

Similarly, if an adult stands in area Y-IV of the floor 4, the infrared radiation is condensed by the lenses 6C, 6B, and 6A corresponding to the infrared detection areas c, b, and a. As shown in FIG. 5B, the pixels of pixel numbers 12, 8, and 4 output signal waveforms each having a corresponding size. Similarly, if a child stands in area X-I, a signal waveform as shown in FIG. 5C is output. If the child stands in area Z-II, a signal waveform as shown in FIG. 5D is output. These output voltages (output waveforms) from the pixels are analyzed, thereby obtaining a variety of information such as the position, the size, the moving direction, and the moving speed of the infrared heat source.

According to the first embodiment, the cylindrical lenses 6A to 6D are arranged such that infrared images are formed on the pixels of the infrared array element without any superposition. The infrared radiation is condensed by the cylindrical lenses corresponding to the infrared detection areas and focused on the corresponding pixels. Therefore, a plurality of pieces of information such as the position, the size, the moving direction, and the moving speed of the infrared heat source can be accurately detected.

In addition, as is well known, a cylindrical lens focuses incident infrared radiation without blurring and variations. In this first embodiment cylindrical lenses 6A to 6D are used to focus infrared radiation into the pixels of the infrared array element 5. Therefore, the infrared radiation is condensed without variations, and the image on each pixel is not blurred.

Furthermore, one infrared array element 5 is used as the infrared sensor, and the number of cylindrical lenses 6A to 6D corresponds to the number of detection areas used. With this simple arrangement, unlike the conventional infrared sensor, neither a driving unit nor a driving control unit are required. Therefore, a compact and inexpensive infrared sensor apparatus can be easily manufactured and assembled.

Figure 6:
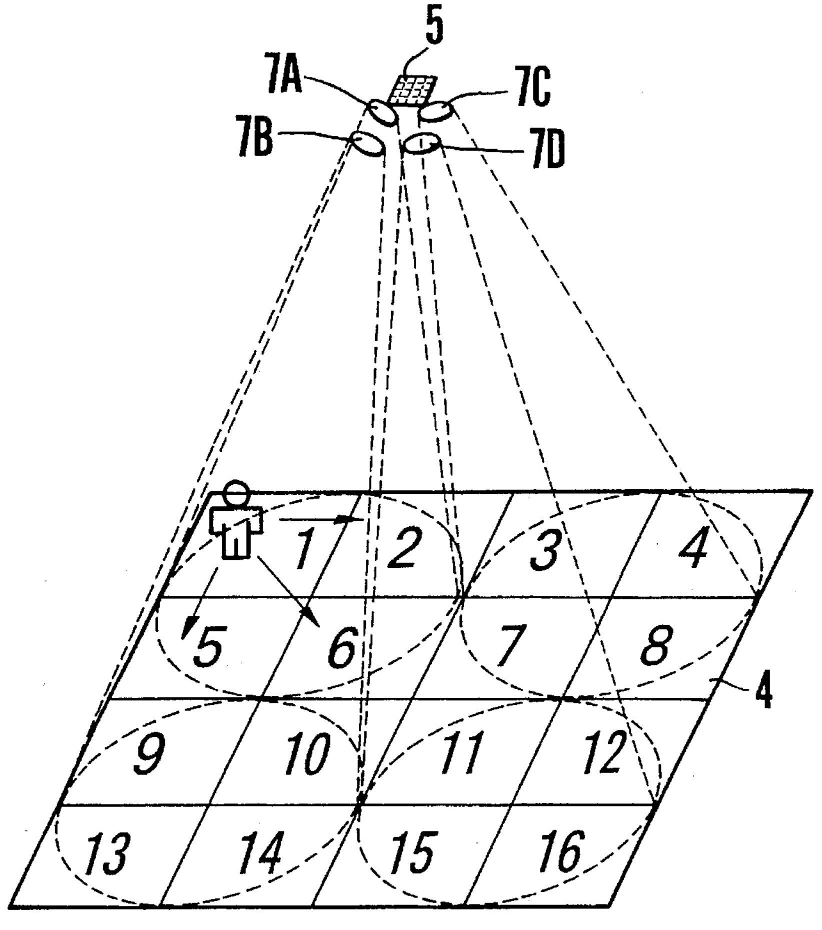
FIG. 6 illustrates an infrared sensor apparatus according to the second embodiment of the present invention.

FIG. 6 is a view showing an infrared sensor apparatus of the second embodiment of the present invention. In this infrared sensor apparatus, as in the first embodiment, a two-dimensional infrared array element 5 is used as an infrared sensor. In this embodiment, a plurality of Fresnel lenses are used as infrared lenses. Each Fresnel lens is arranged in to correspond to a block of pixels having the same number of pixels in the column and row directions, i.e., 2×2=4 pixels of the infrared array element 5. That is, in this embodiment, four Fresnel lenses 7A to 7D are arranged in correspondence with array blocks of pixel numbers 1, 2, 5, and 6, pixel numbers 3, 4, 7, and 8, pixel numbers 9, 10, 13, and 14, and pixel numbers 11, 12, 15, and 16.

A floor 4 where an infrared heat source such as a human body enters is conveniently divided into 4×4 portions in the column and row directions to form 16 areas. Infrared radiation from areas 1, 2, 5, and 6 of the divided floor is focused by the Fresnel lens 7A on the block of pixels of pixel numbers 1, 2, 5, and 6. The infrared radiation from floor areas 9, 10, 13, and 14 is focused by the Fresnel lens 7B on the pixels of pixel numbers 9, 10, 13, and 14. The infrared radiation from floor areas 3, 4, 7, and 8 is focused by the Fresnel lens 7C on the pixels of pixel numbers 3, 4, 7, and 8. The infrared radiation from floor areas 11, 12, 15, and 16 is focused by the Fresnel lens 7D on the pixels of pixel numbers 11, 12, 15, and 16. The infrared radiation from floor area 1 is focused on only the pixel of pixel number 1. The infrared radiation from floor area 2 is focused on only the pixel of pixel number 2. The infrared radiation from area 5 is focused on only the pixel of pixel number 5. The infrared radiation from area 6 is focused on only the pixel of pixel number 6, and so on. As described above, the Fresnel lenses are arranged such that the infrared images from the floor areas are individually formed on the corresponding pixels without any superposition.

In the second embodiment, the infrared array element 5 is divided into four blocks, and one Fresnel lens is arranged for each block. For this reason, the infrared radiation from each infrared detection area is condensed by a Fresnel lens corresponding to the detection area and focused on a block of pixels corresponding to the lens, thereby accurately detecting a plurality of pieces of information.

One infrared array element 5 is used as the infrared sensor, and the number of Fresnel lenses 7A to 7D corresponds to the number of blocks of pixels used. With this arrangement, as in the first embodiment, a compact and inexpensive infrared sensor apparatus can be easily manufactured and assembled.

The present invention is not limited to the above embodiments and can be implemented in various forms. For example, the cylindrical lens consists of a high-density polyethylene material. However, other infrared transmitting materials can be used.

The infrared array element is divided into 4×4=16 pixels. However, the infrared array element may be divided into, e.g., 5×5=25 pixels. The number of pixels is not limited provided it falls within a range not adversely affecting the manufacture of the infrared sensor apparatus.

In the first embodiment, the infrared lenses are designed and arranged such that the focal points of the infrared lenses do not cause superposition of images between the rows of pixels of the infrared array element. However, for example, a partition plate of a plastic or the like may be provided between the infrared lenses to prevent superposition of images.

In the first embodiment, the cylindrical lenses 6A to 6D are arranged in correspondence with the rows of pixels 3 of the infrared array element 5. However, the cylindrical lenses 6A to 6D may also be arranged in correspondence with the columns of pixels 3 of the infrared array element 5.

In the first embodiment, one cylindrical lens is arranged in correspondence with one row of the pixels 3 of the infrared array element 5. In the second embodiment, 2'2=4 pixels of the infrared array element constitute one block. However, for example, the infrared array element may be divided into 6×6=36 pixels. In this case, 3×3=9 pixels may constitute one block, and one Fresnel lens may be arranged for each block of 9 pixels. The number of pixels included in one block is not particularly limited.

In both embodiments, a pyroelectric electrode is used for each pixel of the infrared sensor. However, in place of the pyroelectric electrode, for example, a resistor whose resistance changes in accordance with the amount of infrared radiation may also be used. Alternatively, a thermocouple element may also be used. The material (element) is not particularly limited so long as it can convert the infrared radiation into an electrical signal.

What is claimed is:

1. An infrared sensor apparatus for detecting at least one infrared heat source in three dimensions comprising a two-dimensional infrared array element having a plurality of infrared detection portions, each of said plurality of infrared detection portions having a plurality of infrared pixels, and a plurality of infrared lenses arranged on an infrared incident side of said infrared array element and directed to a detection space, said detection space being divided into the same number of detection areas as said plurality of infrared detection portions, each of said plurality of infrared lenses corresponding to said detection areas and to said plurality of infrared detection portions, respectively, whereby infrared images from said detection areas are formed on said plurality of infrared detection portions.

2. An apparatus according to claim 1, wherein said plurality of infrared lenses comprise a plurality of cylindrical lenses, said plurality of infrared pixels are aligned in plural columns or rows, and said detection areas are divided into the same number as said plurality of infrared detection portions, whereby infrared images from said divided detection areas are focused onto said plurality of infrared detection portions, respectively.

3. An apparatus according to claim 1, wherein said plurality of infrared lenses comprise a plurality of Fresnel lenses, said plurality of infrared detection portions are aligned in plural rows and columns, said plurality of infrared pixels are aligned in plural rows and columns, and said detection areas are divided into the same number as said plurality of infrared detection portions, whereby infrared images from said divided detection areas are focused onto said plurality of infrared detection portions, respectively.

4. An apparatus according to claim 1, wherein said infrared lenses comprise cylindrical lenses, said cylindrical lenses correspond to said detection areas, and said cylindrical lenses condense infrared radiation from the infrared heat source in three dimensions and focus it onto said infrared detection portions.

5. A device for detecting at least one infrared heat source within a volume of space, the device comprising:

an infrared array having a plurality of detection portions, each array detection portion having a plurality of detection pixels, the volume of space being divided into a plurality of detection regions; and a plurality of infrared lenses, each infrared lens corresponding to one of the detection regions and to one of the array detection portions, each infrared lens having means for focusing infrared images from its corresponding detection region onto its corresponding array detection portion.

6. The device of claim 5 wherein the detection portions have a plurality of detection pixels arranged in a plurality of rows and columns, each array detection portion comprising one of the rows.

7. The device of claim 6 wherein the plurality of infrared lenses comprise cylindrical lenses.

8. The device of claim 5 wherein the detection portions have a plurality of detection pixels arranged in a plurality of rows and columns, each array detection portion comprising one of the columns.

9. The device of claim 8 wherein the plurality of infrared lenses comprise cylindrical lenses.

10. The device of claim 5 wherein each infrared lens is positioned so that each array detection portion can have infrared images from only one of the detection regions focused thereon.

11. The device of claim 5 wherein the plurality of detection pixels for each array detection portion are arranged in a block having n rows and n columns, where n equals a positive integer greater than 1.

12. The device of claim 11 wherein the plurality of infrared lenses comprise Fresnel lenses.

13. The device of claim 5 and further comprising means for generating a signal indicative of the amount of infrared radiation detected by the detection pixels; and wherein each of the plurality of infrared lenses has a single condensing surface for condensing infrared images from the volume of space onto a corresponding detector portion.

14. The device of claim 13 wherein the volume of space is divided into a plurality of detection regions, each infrared lens having means for condensing infrared images emitted within each detection region solely onto its corresponding detection portion.

15. The device of claim 14 wherein the detection portions are arranged so that said plurality of pixels comprise a two-dimensional array having n rows and n columns, where n equals a positive integer greater than 1.

16. The device of claim 14 wherein each infrared lens is a cylindrical lens.

17. The device of claim 14 wherein each infrared lens is a Fresnel lens.

* * * * *